United States Patent [19]

Busenberg

[11] Patent Number: 5,270,756
[45] Date of Patent: Dec. 14, 1993

[54] METHOD AND APPARATUS FOR GENERATING HIGH RESOLUTION VIDICON CAMERA IMAGES

[75] Inventor: Stavros N. Busenberg, Claremont, Calif.

[73] Assignee: Hughes Training, Inc., Arlington, Va.

[21] Appl. No.: 838,612

[22] Filed: Feb. 18, 1992

[51] Int. Cl.$^5$ .............................................. H04N 7/18
[52] U.S. Cl. .................................. 358/109; 358/217
[58] Field of Search ....................... 358/109, 217, 113

[56] References Cited

U.S. PATENT DOCUMENTS 3,560,642  2/1971  Schroader ........................... 358/217
3,716,669  2/1973  Watanabe ............................ 358/109

Primary Examiner—Howard W. Britton
Attorney, Agent, or Firm—Wanda K. Denson-Low

[57] ABSTRACT

An efficient system for generating high resolution photogrammetric image data from a Vidicon camera. The Vidicon camera acquires sequential images of a scene and provides multiple overlapping frames of sequential image data corresponding thereto. A mechanism is provided for maintaining the camera at an optimal angle relative to the direction of movement of the vehicle. A processor operates on the multiple overlapping frames of sequential image data to provide image data of enhanced resolution. Use of overlapping frames of video data allows for the production of images with higher resolution than is currently obtainable with Vidicon cameras or photographic film. In addition, the data is digitizable and convertible to images in real time. Thus, a more efficient system is provided for generating high resolution photogrammetric image data from a Vidicon camera.

12 Claims, 5 Drawing Sheets

METHOD AND APPARATUS FOR GENERATING HIGH RESOLUTION VIDICON CAMERA IMAGES

BACKGROUND OF THE INVENTION

1. Field of the Invention

The present invention relates to photogrammetry. More specifically, the present invention relates to methods and apparatus for improving the resolution of Vidicon cameras used in photogrammetric applications.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Photogrammetry involves the use of aerial photography to produce maps and charts. Generally, photogrammetry works on the principle of stereo pairs in that an area is photographed from two different camera positions. The area of common coverage in each photograph is called the stereoscopic overlap. This area offers the means to determine the depth of a particular scene.

Each photograph may be considered a record of the various light rays or intensities which travel from the object viewed and are typically registered on photographic film. The intersection of corresponding light rays from each photograph provides information on the 3-dimensional aspects of the terrain.

Thus, traditional data acquisition in the generation of 3-D databases is in the form of photography. However, there are certain limitations associated with the use of conventional photographic techniques in photogrammetric applications. For example, the production of digitized visual databases from photographs is somewhat costly and time consuming. In addition, the quality of the visual data is limited by the grain size of the photographic film. Also, such data is often not up to date, requires time consuming film processing and needs to be extensively processed in order to be put in digitized form.

Video data is often more current and is either in digitized form or easily converted to such form. Thus, for photogrammetric applications a Vidicon (video) camera would be useful. However, the resolution of standard Vidicon camera data is limited by the spacing of the camera scan lines.

Thus, there is a need in the art for a more efficient technique for generating high resolution photogrammetric image data. Particularly, there is a need for a technique for improving the resolution of a Vidicon camera in a photogrammetric application.

SUMMARY OF THE INVENTION

The need in the art is addressed by the present invention which provides a system for generating high resolution photogrammetric images from a Vidicon camera. The Vidicon camera acquires sequential images of a scene and provides multiple overlapping frames of sequential image data corresponding thereto. A mechanism is provided for maintaining the camera at an optimal angle relative to the direction of movement of the vehicle. A processor operates on the multiple overlapping frames of sequential image data to provide image data of enhanced resolution.

Use of overlapping frames of video data allows for the production of images with higher resolution than is currently obtainable with Vidicon cameras or photographic film. In addition, the data is digitizable and convertible to images in real time. Thus, a more efficient system is provided for generating high resolution photogrammetric image data from a Vidicon camera.

DESCRIPTION OF THE INVENTION

Illustrative embodiments and exemplary applications will now be described with reference to the accompanying drawings to disclose the advantageous teachings of the present invention.

Figure 1:
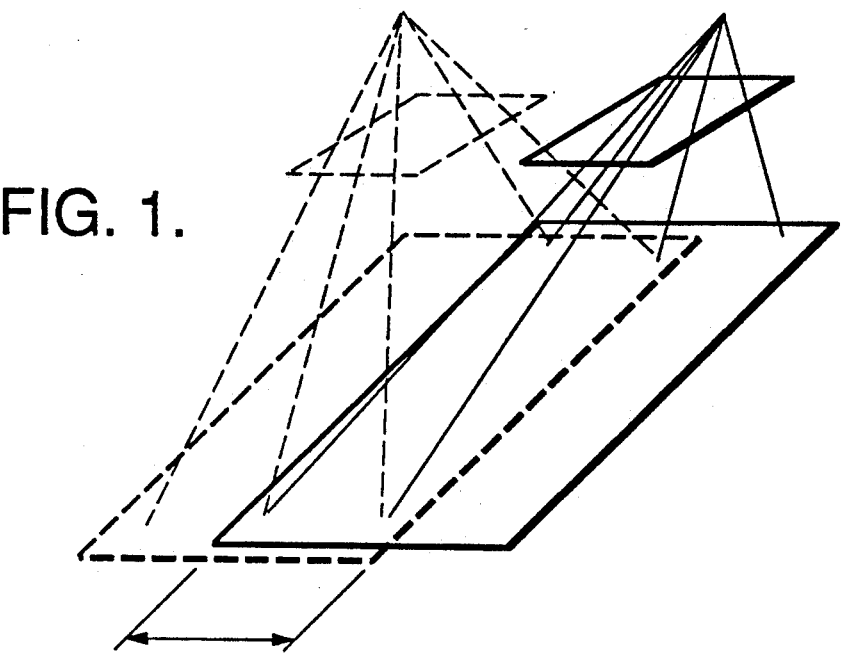
FIG. 1 is a diagram of a photogrammetric system illustrating the area of common coverage resulting from two different camera positions.

FIG. 1 is a diagram of a photogrammetric system illustrating the area of common coverage resulting from two different camera positions. In order to construct a 3-D optical model of the scene, four orientation steps must be taken.

The interior orientation refers to the perspective geometry of the camera: the focal length, the position of the principal point in the image plane and the distortion characteristics of the lens system. The principal point is the center of the image, determined by four fiducial marks, on the center of each edge of the image.

The exterior orientation is the determination of the altitude and relative position of the cameras by the change in scale along lines parallel to the principal line. The principal line is defined by the principal point and the nadir point, which coincides with the principal point only in the case of a truly vertical photograph. The exterior orientation is defined by the geographic position of the exposure center, expressed as three dimensional rectangular coordinates, and the direction of the optical axis expressed in the rotational angles, $\omega$, $\phi$, and $\kappa$ which correspond to the x, y, and z axes, respectively. The optical axis is the line extending from the camera position, perpendicular to the image plane.

Figure 2:
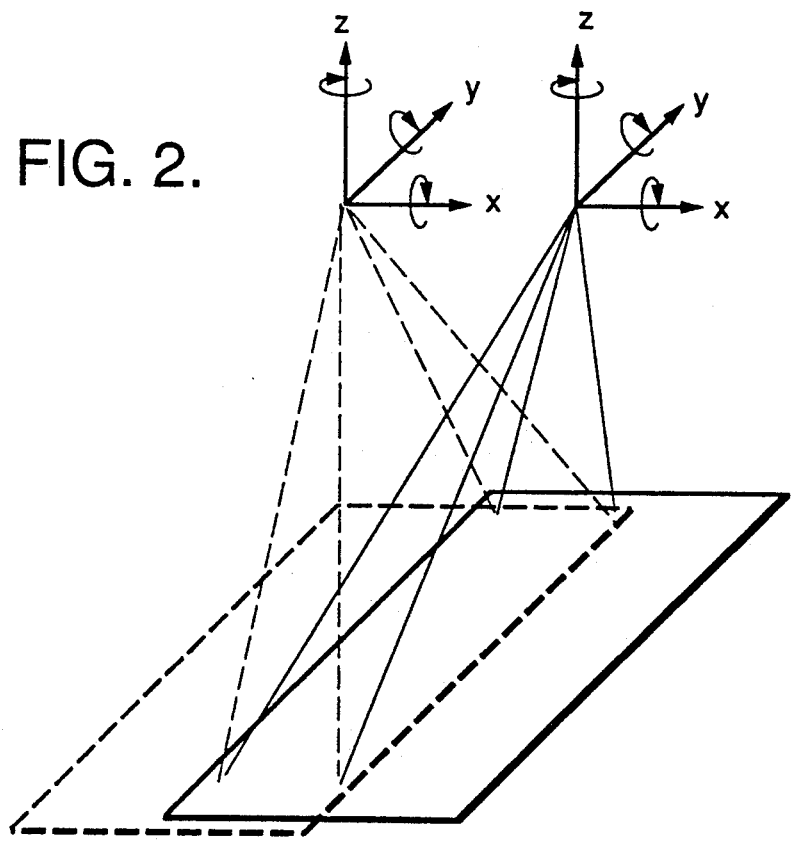
FIG. 2 is a diagram of a photogrammetric system illustrating the relative orientation (position and altitude) of two photographs with respect to each other.

The relative orientation is the determination of the relative position and altitude of the two photographs with respect to each other. See FIG. 2. FIG. 2 is a diagram of a photogrammetric system illustrating the relative orientation (position and altitude) of two photographs taken from two different positions of the aircraft. The orientation of the aircraft position on the left with respect to the one on the right can be obtained from a reading of the altimeter and a knowledge of the direction and speed of the craft and the time lapse between the two photographs.

Finally, absolute orientation is the determination of the position of a point with respect to a known 3-dimensional coordinate of the ground.

The present invention teaches the use of a Vidicon camera to acquire sequential images of a scene from a moving aircraft and to provide multiple overlapping frames of sequential image data corresponding thereto. A particularly novel aspect of the present invention is the provision of a system for maintaining the camera at an optimal angle relative to the direction of movement of aircraft. The multiple overlapping frames of sequential image data are processed to provide image data of enhanced resolution. Although a physical implementation of the system is discussed more fully below, a mathematical foundation is provided here to more clearly disclose the present teachings.

Figure 3:
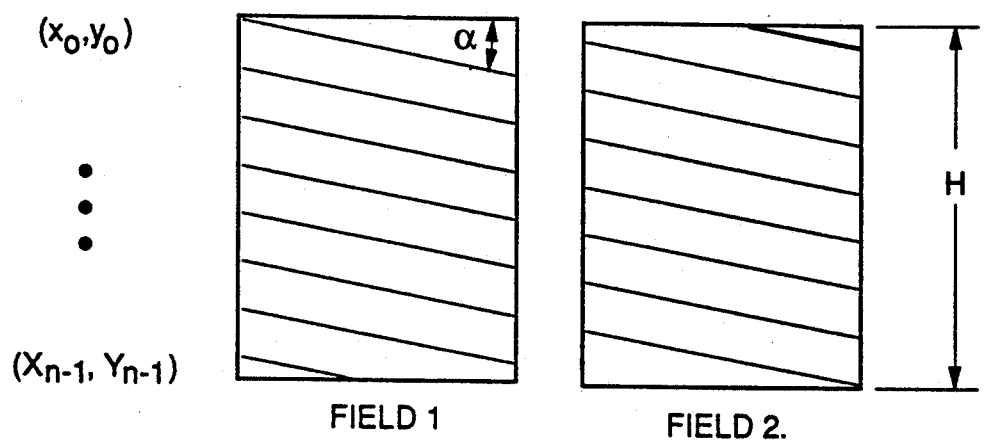
FIG. 3 depicts two fields of a video frame.

First, it is useful to define the process of Vidicon (video) recording and certain difficulties associated therewith. A video camera differs from a typical camera in that an instantaneous picture is not formed. Instead, the picture is divided sequentially into pieces for transmission or viewing. Generally, a total of 525 scan lines comprise a complete picture or frame. Typically, thirty frames are generated in one second. Each frame is comprised of two fields, with each field containing 262.5 scan lines. Scan lines from the first field interlace the scan lines from the second field. Two such fields are shown in FIG. 3. In an actual video camera, the number of scan lines will be much greater than those shown.

Data is typically recorded by a camera mounted on an aircraft, as the aircraft moves, the image changes with respect to the velocity of the aircraft while the image is being scanned. Therefore, definition of an actual data format relative to the reference frame of the ground requires use of a video data format relative to the aircraft's frame of reference. The basic parameters of the video system are defined below and the relation between the geometries of each field are derived for a stationary camera and a moving camera. This is done initially in the focal plane of the camera. Subsequently, more general solutions of the problem in the ground reference frame are set forth.

Mathematical Description of Scan Lines

Figure 4:
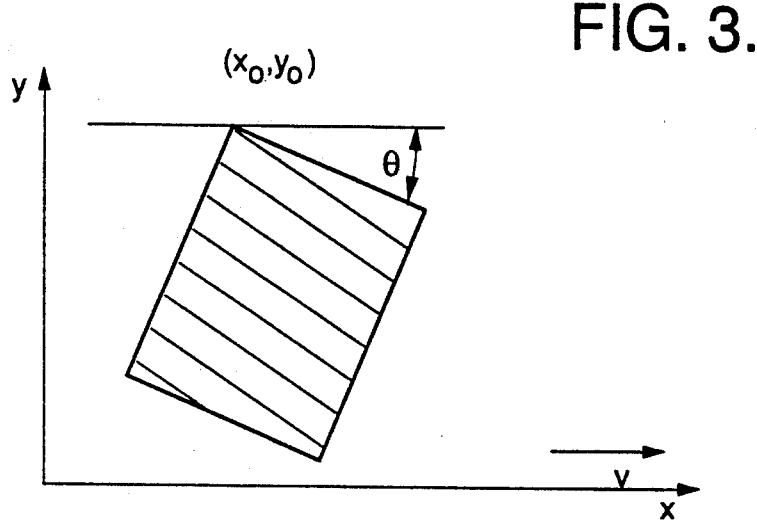
FIG. 4 depicts a moving frame of reference of a video scanning system.

FIG. 4 depicts a moving frame of reference of a video scanning system. The coordinate system is fixed as shown with the positive x direction being the direction of flight. With reference to FIGS. 3 and 4, v denotes the velocity of the plane, H is the height of a field, W is the width of a field, $\theta$ is the angle of rotation (in yaw) about the z axis (not shown, extends out of the page) between the positive x direction and the top of the frame, $\alpha$ is the angle of the scan lines with respect to the top of the frame as shown, $\tau$ is the time from the start of one scan line to the start of the next, p is the percent of $\tau$ spent scanning and $v_s$ denotes the sweep velocity of the scanner in the moving frame of reference and is given by equation [1] below.

$$V_s = \frac{W}{\cos \alpha} \frac{1}{p\tau} \quad [1]$$

In the fixed reference frame, the field generated by the moving camera will be distorted due to the movement of the aircraft. The corresponding scan lines will be skewed and lengthened or compressed depending on the angle $\theta$.

Figure 5:
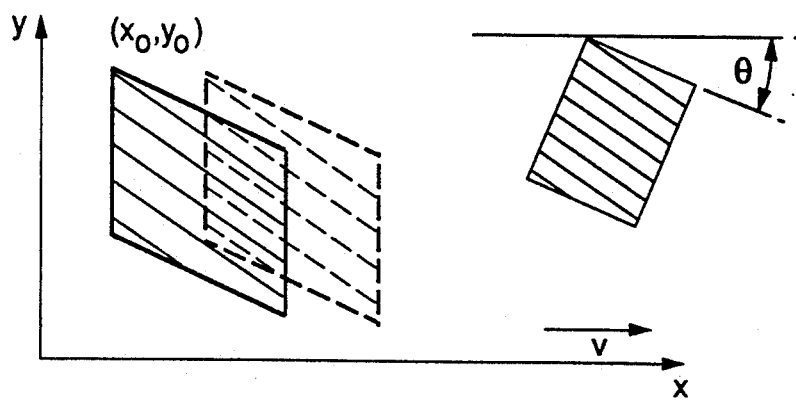
FIG. 5 shows two fields of scan lines of a video scanning system in a fixed frame of reference.

Two fields of scan lines are shown in FIG. 5 in a fixed frame of reference. In this figure, let $(x_i, y_i)$ denote the location of the start of can line "i", the first scan line being line 0. Note that the first and last lines of the fields may be half lines.

Using the above notation, the parametric equations for line 0 of the first field can be derived:

$$x(t) = x_0 + (V_s \cos(\theta + \alpha) + v)t = x_0 + C_x t \text{ for } t \in (0, p\tau) \quad [2a]$$

$$y(t) = y_0 - V_s \sin(\theta + \alpha)t = y_0 + C_y t \text{ for } t \in (0, p\tau) \quad [2b]$$

In equations [2a] and [2b], $(x_0, y_0)$ represents the starting point of the line. The terms $V_s \cos(\theta + \alpha)$ and $V_s \sin(\theta + \alpha)$ represent the movement of the scan line due to the velocity of the scanner in the x and y directions, respectively. $C_x$ and $C_y$ are abbreviations for the corresponding velocities in the x and y directions. Finally, the time t goes from 0 to $p\tau$, which is the time spent scanning line 0.

For line 1, the aircraft will have moved a distance $v\tau$ in the positive x direction before starting the line. Also, this line will have moved down (away from the top of the frame in the field a distance H/N, where N is the number of scan lines in a field. Taking these effects into account, the point $(x_1, y_1)$ is given by:

$$y_1 = y_0 - \frac{H}{N} \cos \theta \quad [3a]$$

$$x_1 = x_0 + v\tau - \frac{H}{N} \sin \theta \quad [3b]$$

The parametric equations for line 1 are then given by:

$$x(t) = x_1 + C_x t \text{ for } t \in (0, p\tau) \quad [4a]$$

$$y(t) = y_1 + C_y t \text{ for } t \in (0, p\tau) \quad [4b]$$

In general, at the start of the ith scan, for $i = 0, 1, 2, \ldots, N-1$, the aircraft will have moved a distance $iv\tau$ and the scan line will be a distance $Hi/N$ down the field. Hence:

$$x_i = x_0 + iv\tau - \frac{H}{N} i \sin \theta \quad [5a]$$

$$y_i = y_0 - \frac{H}{N} i \cos \theta \quad [5b]$$

$$x(t) = x_i + C_x t \text{ for } t \in (0, p\tau) \quad [6a]$$

$$y(t) = y_i + C_y t \text{ for } t \in (0, p\tau) \quad [6b]$$

If the last line in the field is a half line, the domain of t must be changed to $(0, p\tau/2)$.

Now, consider the line N, the first line of the second field. Let $\zeta$ denote the time from when the scanner starts scanning one field to the time when it starts scanning the next. The aircraft will move a distance $v\zeta$ in the positive x direction during the scanning of a field. If the first line of this field starts halfway across the screen, as it does with video, the following equations will define $(x_N, y_N)$ and line N.

$$x_N = x_0 + v\zeta + \frac{W}{2}\cos\theta \quad [7a]$$

$$y_N = y_0 - \frac{W}{2}\sin\theta \quad [7b]$$

$$x(t) = x_N + C_x t \text{ for } t \in \left(0, \frac{p\tau}{2}\right) \quad [8a]$$

$$y(t) = y_N + C_y t \text{ for } t \in \left(0, \frac{p\tau}{2}\right) \quad [8b]$$

where $W/2(\cos\theta)$ and $W/2(\sin\theta)$ represent the distances the line is moved in the x and y directions, respectively, due to the scan line starting halfway across the field. Similarly, equations may be derived for the remaining scan lines of this field and all the fields thereafter.

Methods of Scanning for Optimal Resolution

In accordance with the teachings of the present invention, the technique employed for determining the optimal scanning method, which respect to resolution, is to minimize the distance from any point on the ground to a point that has been scanned. First, the situation is analyzed in which at least two fields overlap. For two overlapping fields, the "optimal" scan is such that the scan lines from the second field fall exactly halfway between the scan lines from the first field.

A particularly novel aspect of this invention is the teaching that the optimal scan can be accomplished by rotating the camera in yaw to an optimal angle $\theta$. To determine the angle $\theta$, the distance between the first two lines of the first field in the fixed frame (hereinafter "$\beta$") and the distance between corresponding lines in the separate fields (hereinafter "d") are determined and $\beta$ is set equal to 2d. Initially, the teaching is provided with respect to the lines as scanned in the aircraft and subsequently after projecting the lines onto the ground.

To this end, a formula is employed which provides a relationship between a point and a line. Given a line defined by the relation $y = ax + b$ and a point $(x^*, y^*)$, the distance between the point and the line, s, is given by:

$$s = \frac{|ax^* + b - y^*|}{\sqrt{a^2 + 1}} \quad [9]$$

To determine $\beta$, equation [9] can be used for s with line 0 and point $(x_1, y_1)$. To simplify the calculation, let $(x_0, y_0) = (0,0)$. From equations [5a], [5b], [6a] and [6b], the equation for line 0 is $y = (C_y/C_x)x$ and the point $(x_1, y_1) = (v\tau - (H/N)\sin(\theta), -(H/N)\cos(\theta))$. So, $\beta$ is given by $$\beta = \frac{\left|\frac{C_y}{C_x}\left(v\tau - \frac{H}{N}\sin\theta\right) + \frac{H}{N}\cos\theta\right|}{\sqrt{\left(\frac{C_y}{C_x}\right)^2 + 1}} \quad [10]$$

Similarly, for d, line 1 can be used along with the point corresponding to the start of the first full scan line of the second field, $(x_{N+1}, y_{N+1})$. To determine d, the point $(x_1, y_1)$ is set equal to $(0,0)$. Again, the line defined by $y = (C_y/C_x)x$ is used but now with the point $(v(\zeta - (p\tau)/2) + (H/2N)\sin(\theta), (H/2N)\cos(\theta))$. So d is given by $$d = \frac{\left|\frac{C_y}{C_x}\left(v\left(\zeta - \frac{p\tau}{2}\right) + \frac{H}{2N}\sin\theta\right) - \frac{H}{2N}\cos\theta\right|}{\sqrt{\left(\frac{C_y}{C_x}\right)^2 + 1}} \quad [11]$$

If equations [10] and [11] are multiplied by $C_x/C_y$ and the values for $C_x$ and $C_y$ are substituted, the above equations can be simplified to:

$$\beta = \frac{\left|-vV_s\tau\sin(\theta + \alpha) + \frac{HV_s}{N}\cos\alpha + \frac{Hv}{N}\cos\theta\right|}{\sqrt{V_s^2 + 2vV_s\cos(\theta + \alpha) + v^2}} \quad [12]$$

$$2d = \frac{\left|-vV_s(2\zeta - p\tau)\sin(\theta + \alpha) - \frac{HV_s}{N}\cos\alpha - \frac{Hv}{N}\cos\theta\right|}{\sqrt{V_s^2 + 2vV_s\cos(\theta + \alpha) + v^2}} \quad [13]$$

As a simple check of the above equations, if v is set to 0, $\beta$ is equal 2d for any angle $\theta$ as when the aircraft is stationary. If $v \neq 0$ equations [12] and [13] can be used to determine what angle $\theta$ will give $\beta = 2d$. Setting $\beta = 2d$ provides:

$$\left|-vV_s\tau\sin(\theta + \alpha) + \frac{HV_s}{N}\cos\alpha + \frac{Hv}{N}\cos\theta\right| = \quad [14]$$

$$\left|-vV_s(2\zeta - p\tau)\sin(\theta + \alpha) - \frac{HV_s}{N}\cos\alpha - \frac{Hv}{N}\cos\theta\right|$$

In the above equations, if $\theta = n\pi - \alpha$ then $\sin(\theta + \alpha)$ is equal to $\sin(n\pi) = 0$ and $\beta = 2d$. This corresponds to the scan lines being parallel to the direction of flight. If the term in the absolute values on the left side of equation [14] is of the opposite sign of the term in the absolute value on the right side, this is the only solution. If instead, for some angle $\theta$, the term in the absolute values on the left side of equation [14] is of the same sign of the term on the right side, there is another solution to the equation which is given by the following:

$$vV_s\left(\zeta - \frac{p\tau + \tau}{2}\right)\sin(\theta + \alpha) + \frac{HV_s}{N}\cos\alpha + \quad [15]$$

$$\frac{Hv}{N}\cos\theta = 0$$

where the absolute value signs have been dropped and the terms have been collected.

Now, using the two trigonometric identities, $\sin(-\theta+\alpha)=\sin\theta\cos\alpha+\sin\alpha\cos\theta$ and $\sin\theta=(1-\cos^2\theta)$ and letting $x=\cos\theta$ in the last equation, the following quadratic in x is obtained:

$$v^2\left[\frac{H^2}{N^2}+\frac{2HV_s}{N}\left(\zeta-\frac{p\tau+\tau}{2}\right)\sin\alpha+V_s^2\left(\zeta-\frac{p\tau+\tau}{2}\right)^2\right]x^2+$$

$$\frac{2HvV_s}{N}\cos\alpha\left[\frac{H}{N}+V_s\left(\zeta-\frac{p\tau+\tau}{2}\right)\sin\alpha\right]x+$$

$$V_s^2\cos^2\alpha\left[\frac{H^2}{N^2}-v\left(\zeta-\frac{p\tau+\tau}{2}\right)^2\right]=0 \quad [16]$$

This can be solved explicitly by using the standard formula for the roots of a quadratic equation, $ax^2+bx+c=0$, namely:

$$f(x)=1.91\times10^{12}x^2+5.70\times10^6x-1.91\times10^{12} \quad [17]$$

Using this technique to determine the angle $\theta$, one must be careful that the solutions for x are both real and between $-1$ and $1$ since $x=\cos\theta$. Also, in the derivation of the quadratic, at one point, both sides of equation had to squared, so the solutions given by this quadratic may not be actual solutions to $\beta=2d$ and should be checked by substituting in equation [14].

Increasing Resolution

Now consider the situation in which more than two fields overlap. As is evident from the above discussion, due to the velocity of the aircraft, the scan lines of the second field do not necessarily fall halfway between the scan lines of the first field. This is accomplished by rotating the camera a specific angle $\theta$. If rather than having two fields overlap, m fields overlap, the optimal method to scan is to have the lines from the second field fall a distance d from the lines in the first field such that $\beta=md$. Since the scan lines from the third field will fall the same distance d from the scan lines in the second field, the scan lines from the m fields are equally spaced. This has the effect of increasing the resolution of the data. If a large number of fields overlap the resolution for video will be higher than that of cameras currently used in photogrammetry. For the remaining calculations, it is assumed that the time spent not scanning is negligible, meaning p=1.

To have the scan lines from the m fields equally spaced $\beta$ must equal md. The equation for $\beta$ is given by equation [12] while the equation for md is given by $$md=\frac{\left|-\frac{m}{2}vV_s(2\zeta-\tau)\sin(\theta+\alpha)-\frac{HV_sm}{2N}\cos\alpha-\frac{Hvm}{2N}\cos\theta\right|}{\sqrt{V_s^2+2vV_s\cos(\theta+\alpha)+v^2}} \quad [18]$$

Using a similar method to the one used for $\beta=2d$ two quadratics are obtained in $x=\cos\theta$. In this case, the solution $\theta=-\alpha$ is not available, except for the case when m=2. Instead, a second quadratic is presented corresponding to the situations in which the terms in the absolute value signs are positive or negative. The two quadratics are given by:

$$v^2\left[\frac{H^2\left(\frac{m}{2}-1\right)^2}{N^2}+\frac{2HV_s\left(\frac{m}{2}-1\right)}{N}\left(m\zeta-\left(\frac{m}{2}-1\right)\tau\right)\sin\alpha+V_s^2\left(m\zeta-\left(\frac{m}{2}-1\right)\tau\right)^2\right]x^2+$$

$$\frac{2HvV_s\left(\frac{m}{2}-1\right)}{N}\cos\alpha\left[\frac{H\left(\frac{m}{2}-1\right)}{N}+V_s\left(m\zeta-\left(\frac{m}{2}-1\right)\tau\right)\sin\alpha\right]x+$$

$$V_s^2\cos^2\alpha\left[\frac{H^2\left(\frac{m}{2}-1\right)^2}{N^2}-v^2\left(m\zeta-\left(\frac{m}{2}-1\right)\tau\right)^2\right]=0 \quad [19]$$

$$v^2\left[\frac{H^2\left(\frac{m}{2}+1\right)^2}{N^2}+\frac{2HV_s\left(\frac{m}{2}+1\right)}{N}\left(m\zeta-\left(\frac{m}{2}+1\right)\tau\right)\sin\alpha+V_s^2\left(m\zeta-\left(\frac{m}{2}+1\right)\tau\right)^2\right]x^2+ \quad [20]$$

$$\frac{2HvV_s\left(\frac{m}{2}+1\right)}{N}\cos\alpha\left[\frac{H\left(\frac{m}{2}+1\right)}{N}+V_s\left(m\zeta-\left(\frac{m}{2}+1\right)\tau\right)\sin\alpha\right]x+$$

$$V_s^2\cos^2\alpha \left[ \frac{H^2\left(\frac{m}{2}+1\right)^2}{N^2} - v^2\left(m\zeta - \left(\frac{m}{2}+1\right)\tau\right)^2 \right] = 0$$

Equation [19] corresponds to the simple solution given above, $\theta = -\alpha$ for $m=2$ and equation [20] reduces to the quadratic equation [16] when $m=2$. In fact, as a check, one may set $m=2$ in the above equations and the equations reduce to the solution $\theta = n\pi - \alpha$ and equation [16]. Once again, in deriving these quadratics, both sides of the equations have to be squared, so one should make sure that solutions to these equations are actually solutions to $\beta = md$. In any event, solving equations [19] and [20] for x and using the relation $\theta = \arccos(x)$ yields the optimal yaw angle $\theta$ at which to set the camera line-of-sight to obtain a desired degree of resolution.

Sensitivity Analysis

Since it can be expected that the angle $\theta$ will deviate from that which is specified, the sensitivity of small variations in angle $\theta$ must be analyzed. The analysis involves the functions $\beta(\theta)$ and $2md(\theta)$. In this section, the sensitivity of $\beta$ and $2md$ to variations in angle $\theta$ are compared. The term $2md$ is used in place of $md$ to simplify the calculations. The only change required will be to allow m to be a multiple of $\frac{1}{2}$ rather than an integer. For a continuously differentiable function $f(\theta)$, given a variation (or error) $\epsilon$ in angle $\theta$, then for small $\epsilon$:

$$(\theta), f^3 \mp (\theta)f \approx (3 \mp \theta)f \quad [21]$$

where the sensitivity index of $f(\theta)$ is $\epsilon f'(\theta)$. The size of this sensitivity index will indicate the accuracy needed for angle $\theta$ and the range of acceptable deviations from this angle $\theta$.

The sensitivity indices of $\beta(\theta)$ and $2md(\theta)$ are then:

$$\beta'(\theta) = v \frac{-V_s\tau G(\theta) + \frac{H}{N}\{V_s\sin\alpha[V_s\cos(\theta+\alpha) + v - v\cos(\theta+\alpha)] - v^2\sin\theta\}}{[V_s^2 + 2vV_s\cos(\theta+\alpha) + v^2]^{\frac{3}{2}}} \quad [22]$$

and $$2md'(\theta) = mv \frac{-V_s(2\zeta - \tau)G(\theta) + \frac{H}{N}\{V_s\cos(\theta+\alpha)[v\sin\theta - V_s\sin\alpha] + v^2\sin\theta - vV_s\sin\alpha\}}{[V_s^2 + 2vV_s\cos(\theta+\alpha) + v^2]^{\frac{3}{2}}} \quad [23]$$

where
$$G(\theta) = \cos(\theta+\alpha)(V_s^2 + vV_s\cos(\theta+\alpha) + v^2) + vV_s \quad [24]$$

By dividing $\beta'(\theta)$ by $\beta(\theta)$ and $2md'(\theta)$ by $2md(\theta)$, the relative sensitivity of these functions is obtained.

Using typical values such as $v=100$ mph, $V_s = 5 \times 10^4$ in/sec, $H=3$ in., $N=262.5$, $\zeta = 1/60$ sec, $\tau = \zeta/2.62.5$, $m=1$, and $\alpha = 0.0035$ rad and the trivial solution $\theta = -\alpha$ yields:

$$\beta^*(-\alpha) = \frac{\beta'(-\alpha)}{\beta(-\alpha)} = \quad [25]$$

$$\frac{-vV_s\tau(V_s + v) - \frac{Hv}{N}\sin\alpha(V_s - v)}{\frac{H}{n}\cos\alpha(V_s + v)^2} = -9.44$$

and $$2md^*(-\alpha) = \frac{2md'(-\alpha)}{2md(-\alpha)} = \quad [26]$$

$$\frac{-mvV_s(2\zeta - \tau) - \frac{Hvm}{N}\sin\alpha}{-\frac{Hm}{N}\cos\alpha(V_s + v)} = 4949$$

These values change to $\beta^*(-\alpha) = -18.2$ and $2md^*(-\alpha) = 9573$ for velocity $v = 200$ mph. These values imply that the sensitivity of $2md(\theta)$ is roughly 525 (or 2N) times that of $\beta(\theta)$. This can be explained by the fact that the $2md(\theta)$ term that is being compared to $\beta(\theta)$ is a line N times removed from $\beta(\theta)$ which would also imply that the error is increasing with every line scanned. The term $md(\theta)$ is N times removed from $\beta(\theta)$ since roughly, $2md(\theta)$ is the scan line corresponding to $\beta(\theta)$ in the next scanning field. The fact that it increased with an increased velocity implies more accuracy is needed with higher velocities.

Another error analysis involves combination of the functions $\beta(\theta)$ and $2md(\theta)$ into one function, $\beta(\theta) - 2md(\theta)$. If we let $F(\theta) = \beta(\theta) - 2md(\theta)$, then $F(\theta) = 0$ at $\beta(\theta) = 2md(\theta)$. The sensitivity index for $F(\theta)$ is given by:

$$\epsilon F(\theta) = \epsilon \frac{\pm 2\zeta mvV_sG(\theta) + v(1 \pm m)H(\theta)}{[V_s^2 + 2vV_s\cos(\theta+\alpha) + v^2]^{\frac{3}{2}}} \quad [27]$$

where $$H(\theta) = \left[-\frac{H}{N}\sin\theta - V_s\tau\cos(\theta+\alpha)\right][V_s^2 + \quad [27]$$

$$vV_s\cos(\theta+\alpha) + v^2] + \frac{HV_s^2}{N}\cos\alpha\sin(\theta+\alpha) +$$

$$\frac{HvV_s}{N}\sin\alpha - vV_s^2\tau$$

and all $\pm$ are replaced by $(+)$ if the variables have the same signs inside the absolute value signs of $\beta(\theta)$ and $2md(\theta)$ or all $\pm$ are replaced by $(-)$ otherwise. Using the typical values described before (which require the $\pm$ signs to be replaced by $(-)$) yields $F'\theta = 56.7$.

This value changes to $F'(\theta) = 109.6$ at velocity $v = 200$ mph, demonstrating sensitivity increases with increases in velocity of the aircraft. The size of this sensitivity index and the index for $v = 100$ mph are large indicating a need for substantial accuracy in angle $\theta$. These conclusions support those of the first analysis of $\beta(\theta)$ and $2md(\theta)$.

Projection of Scan Lines onto the Ground

To examine the resolution of scan lines projected on the ground, a derivation is employed which is similar to that set forth above in the section entitled Mathematical Description of Scan Lines in which scan lines on the image are examined. The same variables are used except a subscript g is used to denote the ground reference frame.

First, consider what the scan lines will look like in a moving frame of reference projected onto the ground. The field will look like the moving frame of reference in the image as shown in FIG. 4, but now the height and width of the frame will be multiplied by the scale factor $s=h/f$, where h is the height of the camera above the ground and f is the focal length of the camera. The sweep velocity of the scanner as measure in this frame on the ground, $V_{gs}$, will also be:

$$V_{gs} = \frac{W_g}{\cos\theta} \frac{1}{\tau} = V_s s \qquad [29]$$

assuming still that $p=1$.

Now, with respect to the fixed frame of reference on the ground, the frame is skewed and stretched or compressed depending on the angle $\theta$ much like that shown in FIG. 5, but the scan lines are at a different angle than in the image in the plane. Letting $(x_{gj},y_{gj})$ denote the starting point of line j on the ground, the parametric equations for the first scan line are given by:

$$x_g(t)=x_{g0}+(V_s s \cos(\theta+\alpha)+\nu)t=x_{g0}+C_{gx}t \text{ for } t \in (0,p\tau) \qquad [30a]$$

$$y_g(t)=y_{g0}-V_s s \sin(\theta+\alpha)t=y_{g0}+C_{gy}t \text{ for } t \in (0,p\tau) \qquad [30b]$$

In these equations, the $V_s s\cos(\theta+\alpha)$ and $V_s s\sin(\theta+\alpha)$ terms are the velocities of the scan on the ground in the x and y directions respectively. The equations for the remaining scan lines in the field may be determined to be $$x_{gj} = x_{g0} + j\nu\tau - \frac{sH}{N} j\sin\theta \qquad [31a]$$

$$y_{gj} = y_{g0} - \frac{sH}{N} j\cos\theta \qquad [31b]$$

$$x_g(t) = x_{gj} + C_{gx}t \text{ for } t \in (0,p\tau) \qquad [32a]$$

$$y_g(t) = y_{gj} + C_{gy}t \text{ for } t \in (0,p\tau) \qquad [32b]$$

Here, $\beta_g$ is defined to be the distance between scan lines on the ground in the fixed frame of reference. Setting $(x_{g0},y_{g0})=(0,0)$, equation [9] can be used along with the line $y=C_{gy}/C_{gx}$ and the point $(x_{gl},y_{gl})=(\nu\tau-(sH/N)\sin\theta,-(sH/N)\cos\theta)$ to determine $\beta_g$ as:

$$\beta_g = \frac{\left| -\nu sV_s\tau\sin(\theta+\alpha) + \frac{s^2HV_s}{N}\cos\alpha + \frac{sH\nu}{N}\cos\theta \right|}{\sqrt{s^2V_s^2 + 2\nu sV_s\cos(\theta+\alpha) + \nu^2}} \qquad [33]$$

-continued $$= \frac{\left| -\nu sV_s\tau\sin(\theta+\alpha) + \frac{s^2HV_s}{N}\cos\alpha + \frac{sH\nu}{N}\cos\theta \right|}{\sqrt{C_{gx}^2 + C_{gy}^2}}$$

Note that the only difference between the distance between scan lines on the ground, $\beta_g$, and the distance between scan lines in the image, $\beta$, is that the height, width, and scanning velocity are multiplied by the scaling factor s. The only factor preventing $\beta_g$ from equaling $\beta_s$ is that the velocity of the aircraft is not multiplied by this scaling factor.

Additional solutions for a Given Resolution

This section provides a teaching by which field overlap is delayed to reduce data storage requirements at a given resolution using the ground as the reference plane. In the derivations for $\beta=2d$ and $\beta=md$, the only case considered was that of corresponding scan lines in different fields being the distance d apart in the images in the camera. Instead, for example, the first line of the second field could be halfway between lines 50 and 51 on the first field and still provide the same resolution as when corresponding scan lines are halfway between. Also, since the images of the fields d not have to be overlapping for the corresponding area viewed by the field on the ground to overlap, the projection of the field on the ground should also be examined.

Figure 6:
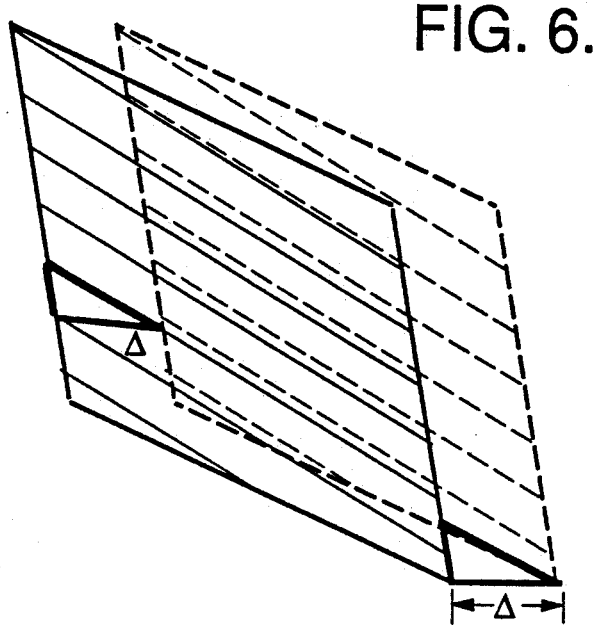
FIG. 6 shows two fields of scan lines of a video scanning system projected on the ground.

Let $\Delta$ denote the distance between scan lines as measured in the direction of flight, the positive x direction. Now, consider the situation when the plane moves a distance such that the scan lines from the second field fall halfway between those of the first, and the second field is moved so that the bottom scan line of the second field falls between the second and third lines from the bottom in the first field as shown in FIG. 6. (FIG. 6 shows two fields projected on the ground with $v\zeta=\Delta$.) As can be seen from the darkened similar triangles in the figure, for this situation to occur, the aircraft velocity must be such that $v\zeta=\Delta$ (the distance between scan lines in the direction of flight)

Figure 7:
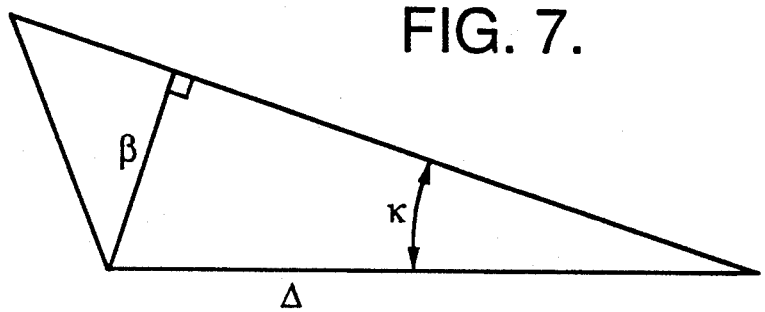
FIG. 7 is an enlarged view of a triangle from FIG. 6 which illustrates the relationship between $\beta_g$ and $\Delta$.

FIG. 7 is an enlarged view of the left darkened triangle from FIG. 6 which illustrates the relationship between $\beta_g$ and $\Delta$. As shown in FIG. 7, it is evident that an altitude drawn from the scan line shown to the bottom left corner of the triangle is $\beta_g$, inasmuch as another scan line would start at the bottom left corner of this triangle. If the angle between the x-axis and the scan line is denoted by $\kappa$, it is evident that:

$$\sin\kappa = \frac{\beta_g}{\Delta} \qquad [34]$$

Using equations [32a] and [32b], the slope of a scan line may be determined to be $C_{gy}/C_{gx}$. Since $\kappa$ is just the angle between the x-axis and a scan line, $\kappa$ can be determined from this slope as:

$$\sin\kappa = \frac{C_{gy}}{\sqrt{C_{gx}^2 + C_{gy}^2}} \qquad [35]$$

Setting equations [34] and [35] equal and using $\beta_g$ from equation [33], $\Delta$ is given by:

$$\Delta = \beta_g \frac{\sqrt{C_{gx}^2 + C_{gy}^2}}{C_{gy}} \quad [36]$$

$$= \frac{\left| -v\, sV_s\tau\sin(\theta + \alpha) + \frac{s^2 HV_s}{N}\cos\alpha + \frac{sHv}{N}\cos\theta \right|}{C_{gy}}$$

If $\Delta$ is set equal to $v\zeta$, so the aircraft moves this distance between fields, the following equation is provided:

$$v\zeta = \frac{\left| -vsV_s\tau\sin(\theta + \alpha) + \frac{s^2 HV_s}{N}\cos\alpha + \frac{sHv}{N}\cos\theta \right|}{C_{gy}} \quad [37]$$

By determining values for the angle $\theta$ and the velocity $v$ that give solutions to this equation, values are provided that will have the scan lines from the second field lying halfway between those of the first field as shown in FIG. 6.

If the aircraft moves twice the distance between the scan lines in the direction of motion or $2\Delta$. This will have the effect of moving the scan lines from the second field so that the bottom line in the second field now falls halfway between the third and fourth lines from the bottom in the first field, as shown in FIG. 8.

Figure 8:
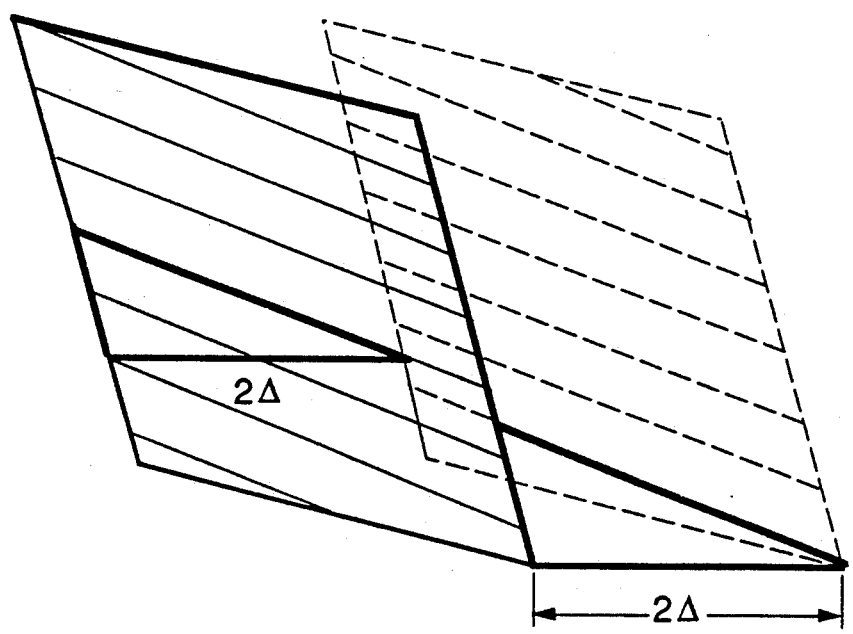
FIG. 8 shows two fields of scan lines of a video scanning system on an aircraft with $v\zeta = 2\Delta$.

FIG. 8 shows two fields of scan lines of a video scanning system on an aircraft with $v\zeta = 2\Delta$. If the aircraft moves a distance $1\Delta$ for some integer 1, the scan lines from the second field will fall halfway between different scan lines in the first field, depending on the value of 1. Note that $v$ is not determined by finding the value of $\Delta$ and moving with a velocity such that $v\zeta$ will be some multiple of same, because $\Delta$ depends on this velocity. In order to determine these other solutions, a value of 1 must be entered into the following equation and determine the velocity $v$ and angle $\theta$ from the equation. For $1 = 1, 2, 3, \ldots$, $$v\zeta = 1 \frac{\left| -vsV_s\tau\sin(\theta + \alpha) + \frac{s^2 HV_s}{N}\cos\alpha + \frac{sHv}{N\cos}\theta \right|}{C_{gy}} \quad [38]$$

As a check of this equation, if $s = 1$ and $1 = 1$, equation [38] reduces to equation [15].

The above derivation may be examined from another perspective by examining what happens if the aircraft only moves $\Delta/2$ during the scanning of a field. If this happens, the lines from the second field line up on the lines of the first field. Now, if the aircraft velocity changes so it moves an additional integral number of $\Delta$, the aircraft has moved $(1+\frac{1}{2})\Delta$ for $1 = 1,2,3,\ldots,$. The effect is to move the second frame so that its lines correlate with different lines from the first field. As the last step, the aircraft velocity is changed slightly so that the scan lines from the second field are either moved forward or backward from the previous step a distance $\Delta/2$. Again, one must remember that the $\Delta$ used above, depends on the final velocity of the aircraft required to move the total distance $\Delta/2 + 1\Delta + \Delta/2$ during the scanning of one field, where $\Delta$ is the distance between scan lines in the direction of flight. This provides the same solutions as before in which $v\zeta = 1\Delta$.

Consider the case with m overlapping fields in which the scan lines from the second field are a distance $\beta_g/m$ from the scan lines in the first field. This is accomplished by a similar method as that used in the previous paragraph. The first two steps are the same, the lines from the second field line up with the lines from the first field. However, instead of changing the velocity so that we move forward or backward $\Delta/2$, the velocity is now changed so that we move forward or backward a distance $\Delta/m$. This causes the lines from the second field to be a distance $\beta_g/m$ from the scan lines in the first field. Recall that $\Delta$ depends on the velocity of the aircraft. To determine the velocity $v$ and angle $\theta$ which are solutions yielding m lines equally spaced, the following equation must be solved:

$$v\zeta = \left( \frac{1}{2} + l \pm \frac{1}{m} \right) \frac{\left| -vsV_s\tau\sin(\theta + \alpha) + \frac{s^2 HV_s}{N}\cos\alpha + \frac{sHv}{N}\cos\theta \right|}{C_{gy}} \quad [39]$$

The velocity $v$ and the angle $\theta$ that satisfy this equation provide solutions having m scan lines equally spaced, except for the case when $\theta = -\alpha$. This corresponds to the scan lines being parallel to the direction of flight and $\Delta = \infty$. In any case, it is important to maintain m overlapping fields to prevent gaps in the data.

Ground Sensitivity Analysis

The sensitivity of $\Delta$ to variations of the angle $\theta$ is determined by using percentage sensitivity. A percentage sensitivity to small variations is attained by dividing a first derivative of a function by the function itself. In this connection, it is desirable to have small values of the percentage sensitivity.

In the following analysis, $\Delta$ is the function whose sensitivity is to be determined with respect to variations in the angle $\theta$. $A(\theta)$, below, is the equation within the absolute value of the numerator of $\Delta$; and $C_{gy}$ is the denominator of $\Delta$. In other words, $$\Delta = \frac{|A(\theta)|}{C_{gy}} \quad [40]$$

Where the equations for $A(\theta)$ and $C_{gy}$ are:

$$A(\theta) = -vsV_s\tau\sin(\theta + \alpha) + \frac{s^2 HV_s}{N}\cos\alpha + \frac{sHv}{N}\cos\theta \quad [41]$$

and $$C_{gy} = -V_s\sin(\theta + \alpha) \quad [42]$$

From these equation, the first derivative can be obtained with respect to the angle $\theta$.

$$\frac{d\Delta}{d\theta} = \pm \frac{\left[-vsV_sT\cos(\theta+\alpha) - \frac{sHv}{N}\sin\theta\right]C_{gy} \pm V_{ss}\cos(\theta+\alpha)A(\theta)}{C_{gy}^2} \quad [43]$$

Now the percentage sensitivity, $(d\Delta/d\theta)/\Delta$, is determined to be $$\frac{1}{\Delta}\frac{d\Delta}{d\theta} = \frac{\left[-vsV_sT\cos(\theta+\alpha) - \frac{sHv}{N}\sin\theta\right]C_{gy} + V_{ss}\cos(\theta+\alpha)A(\theta)}{C_{gy}A(\theta)} \quad [44]$$

Figure 9:
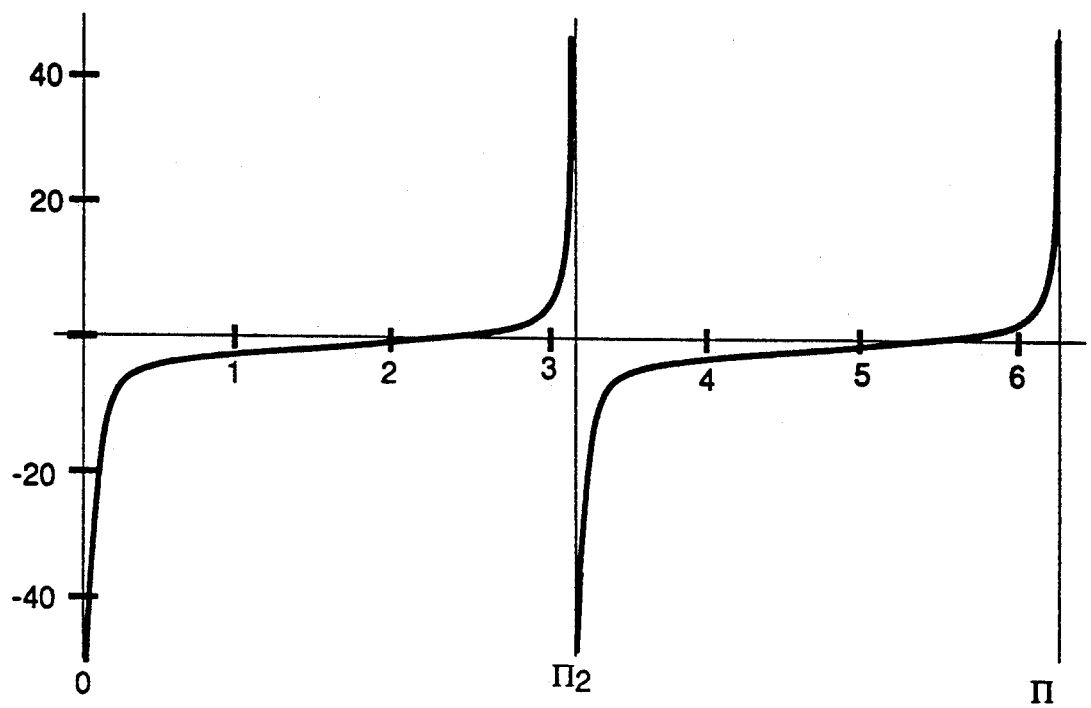
FIG. 9 is a graph of a function depicting the result of a sensitivity analysis with respect to the ground reference frame.

The graph of this function, using the typical values used for the previous sensitivity analysis and with the x-axis representing values of the angle $\theta$ measured in radians is shown in FIG. 9. From FIG. 9 it is apparent that $\Delta$ is extremely sensitive to variations of the angle $\theta$ for values of the angle $\theta$ near 0, $\pi$, and multiples of $\pi$. Whereas it is less sensitive to values of the angle $\theta$ in the flatter regions. Thus, $\Delta$ will be affected the least by small errors in the camera yaw angle $\theta$ when the angle $\theta$ is away from multiples of $\pi$.

This can be explained by approximating $(1\Delta)d\Delta/d\theta$ to $$\frac{1}{\Delta}\frac{d\Delta}{d\theta} \approx -\cot(\theta+\alpha) \quad [45]$$

Optimal Camera Rotations

In determining $\Delta$ relative to the aircraft velocity, as described in the above section, the distance $\Delta$ is next compared to the width of a respective field, or more specifically to the width of the overlap between fields relative to the direction of motion. See FIG. 6. This overlap width represents the range of possible aircraft velocities in which the second frame is displaced so that $v\zeta=1\Delta$. Clearly, the second field may only be displaced a distance $1\Delta$, such that $1\Delta \leq \mu$, where $\mu$ corresponds to the extent of overlap between fields. For $1\Delta > \mu$, there are no longer two perspectives for all of the data. Furthermore, with $l=1$, since $\Delta$ is dependent upon the angle $\theta$ in equation [36], the angle $\theta$ may be optimized by limiting the range of the angle $\theta$ such that the first solution is $\Delta \leq \mu$.

It is evident that a rotated frame, in the moving frame of reference, is contracted some angle, $\psi$, in the fixed frame of reference. This is due to the direction of the velocity of the plane at a given angle $\theta$. In order to determine i, the width of the fixed frame in the direction of motion, $\psi$ must first be calculated as well as j, the perpendicular width of the frame relative to the frame's left and right edge. The width i can be defined as $$i = \frac{w\sin\psi}{\cos\left(\frac{\pi}{2} - \theta - \psi\right)} \quad [46]$$

Figure 10:
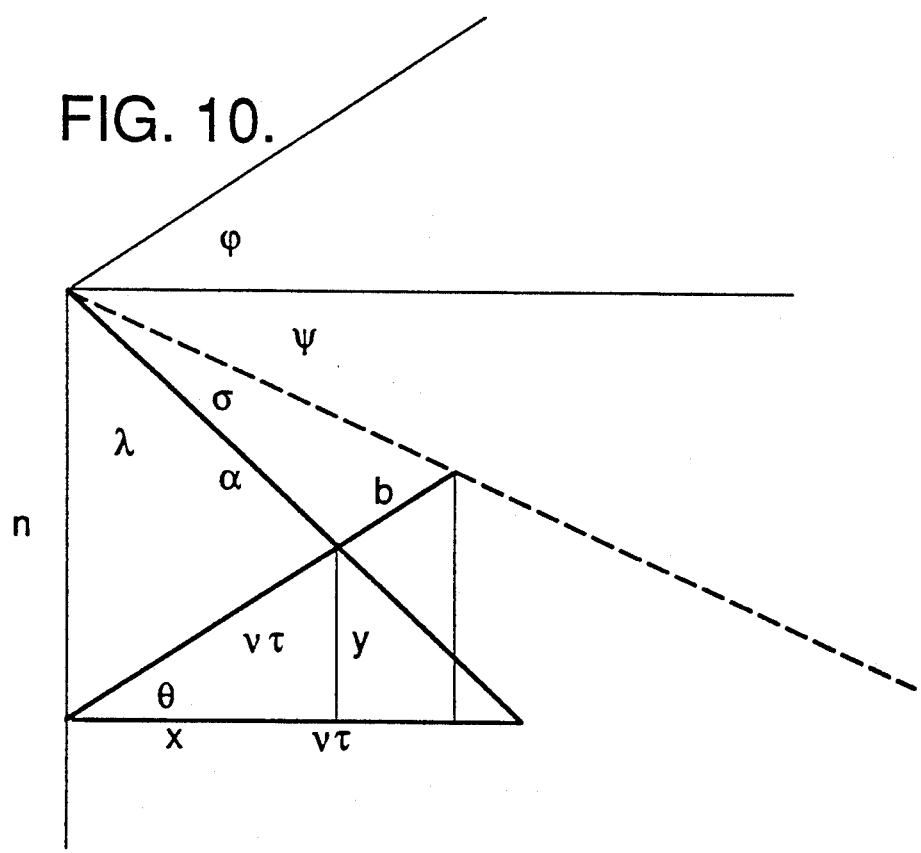
FIG. 10 depicts an enlarged vector displacement between scan lines.

In order to determine $\psi$, however, the changes in frame shape of the rotated fixed frame as compared to the non-rotated fixed frame must be analyzed. See FIG. 10 which depicts an enlarged vector displacement between scan lines. Here, $n=H/N$, where H is the original frame height, $\lambda$ corresponds to the angle displacement of the scan lines with no rotation of the angle $\theta$. With the geometric relationships of similar triangles and the trigonometric functions of right triangles, the following relationships may be derived:

$$\frac{v\tau\sin\theta}{y} = \frac{v\tau\cos\theta}{x} \quad [47]$$

$$\tan\bar{\lambda} = \frac{y}{v\tau - x} \quad [48]$$

After solving the above equations for the two unknowns, $$x=(v\tau\tan\bar{\lambda})/(\tan\theta\tan\bar{\lambda})$$

and $$y=(v\tau\tan\theta\tan\bar{\lambda})/(\tan\theta+\tan\bar{\lambda})$$

the values of a and b may next be determined, $$a=(n-y)/\cos\lambda$$

and $$b=v\tau-(x^2+y^2)^{\frac{1}{2}}.$$

Because, the angle between a and b is simply $\pi-\theta-\lambda$ we can apply the law of cosines and determine $\sigma$:

$$\sigma = \arccos\left[\frac{a^2 - ab\cos(\bar{\theta}+\lambda)}{(a^4 + a^2b^2 - 2a^3b\cos(\theta+\lambda))^{\frac{1}{2}}}\right] \quad [49]$$

$\psi$, then, is simply $\lambda-\sigma$. In order to obtain the length overlap, $\mu$, it is necessary to subtract $\Delta$ from i, $\mu=i-\Delta$. Finally, using equation [36], at $\Delta=i/2$, $\mu=i/2$, gives an overlap of exactly half the frame width. Any distance $\Delta>i/2$ will then give less than half overlap, causing gaps in the data and the loss of stereo pairs. This is also true of $\Delta>\mu$ since at $\Delta=\mu$, $i=2\Delta$, or $\Delta=i/2$, resulting in the previous case. Therefore all angles $\theta$, such that $\Delta>\mu$, or $\Delta>i/2$, may be discarded.

Physical Implementation

Figure 11:
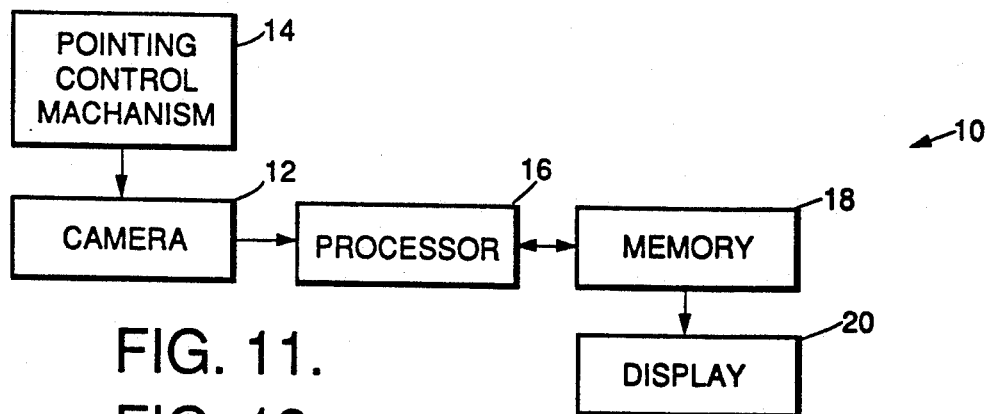
FIG. 11 shows an illustrative photogrammetric system for implementing the teachings of the present invention.

FIG. 11 shows an illustrative photogrammetric system for implementing the teachings of the present invention. The system 10 is adapted for use with a Vidicon or video camera 12 mounted on an aircraft (not shown) having a longitudinal (x or roll) axis, a transverse (y or pitch axis) and a z (yaw) axis. The camera is mounted for rotation about the yaw axis as discussed above. A pointing control mechanism maintains the camera 12 at an optimal angle $\theta$ about the yaw axis with respect to the roll axis for a desired resolution in the manner discussed above. The output of the camera is input to a processor 16 which correlates aircraft position and speed with respect to a known object in a conventional manner and provides output image data. The output of the processor is input to a memory 18 for subsequent processing or display.

Figure 12:
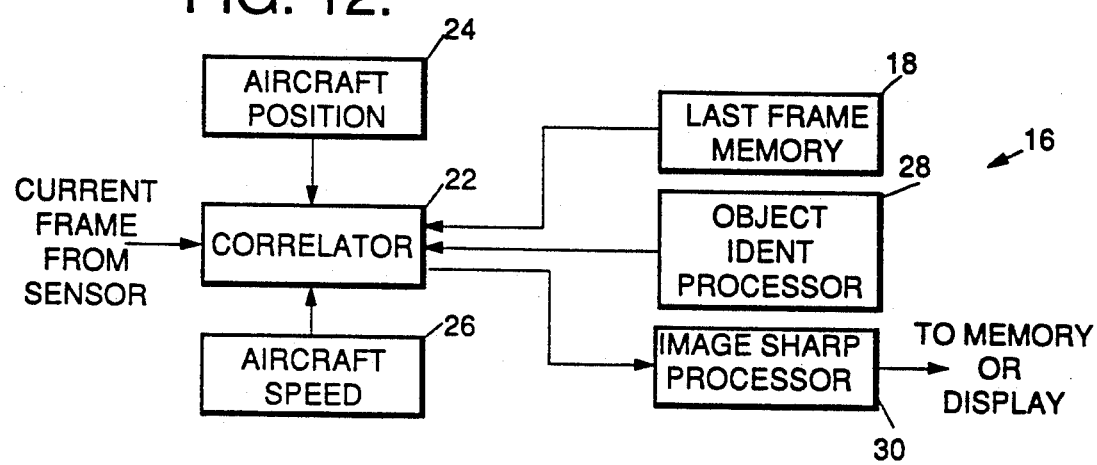
FIG. 12 is a block diagram of the processor of the illustrative photogrammetric system for implementing the teachings of the present invention.

FIG. 12 is a block diagram of the processor of the illustrative photogrammetric system. The processor 16 includes first and second registers 24 and 26 which store aircraft position and speed information respectively from a conventional external source (not shown). The element 22 correlates a current frame of image data from the camera 12 with previous frames of image data provided by the memory 18 and aircraft position and speed information. The prepocessor embodies an electronic hardware implementation of the resolution enhancement method set forth herein and organizes the resulting high resolution image data for further processing by standard photogrammetric techniques. The first of these tasks is implemented as follows:

With the camera yaw angle $\theta$ fixed to yield an m-fold enhancement of the data according to equations [19] and [20], the scan line data from (m-1) successive Vidicon frames is ordered in the sequence k, N+k, 2n+k, ..., (m−1)N, k+1, for k=1, 2, ..., N.

The ordered scan lines are cropped sequentially removing from the lines of the first frame the initial position of length $(m-1)v\zeta/(s\cos(\theta+\alpha))$, from those of the second frame the initial length $(m-2)v\zeta/(s\cos(\theta+\alpha))$ and from the end position of the scan lines the length $v\zeta/(s\cos(\theta+\alpha))$, and, in general, from the lines of the kth frame the initial length $(m-k)v\zeta/(s\cos(\theta+\alpha))$ and the end position of length $kv\zeta/(s\cos(\theta+\alpha))$. This cropped (m−1) from data field provides the data for a single m−fold resolution enhanced data set and it is labeled with position and elevation of the aircraft and stored in memory.

Standard correlation methods are used on the stored enhanced data to locate the same objects in different sets of such data obtained from position of the aircraft that are far from each other. Standard photogrammetric methods can then be used to yield a three dimensional enhanced resolution reconstruction of the terrain that has been scanned. A second memory 28 provides object reference information. The output of the correlator 22 is sharpened by a filter 30 which interleaves data from the scan lines of overlapping frames.

Thus, the method of the present invention is as follows:

1) sequential Vidicon camera images of terrain are obtained from a moving vehicle;

2) vehicle position is established using known image correlation methods;

3) the camera is mounted at an optimal angle relative to the direction of flight; and 4) a database is produced of enhanced accuracy by interleaving the data from the scan lines of overlapping frames.

Figure 13:
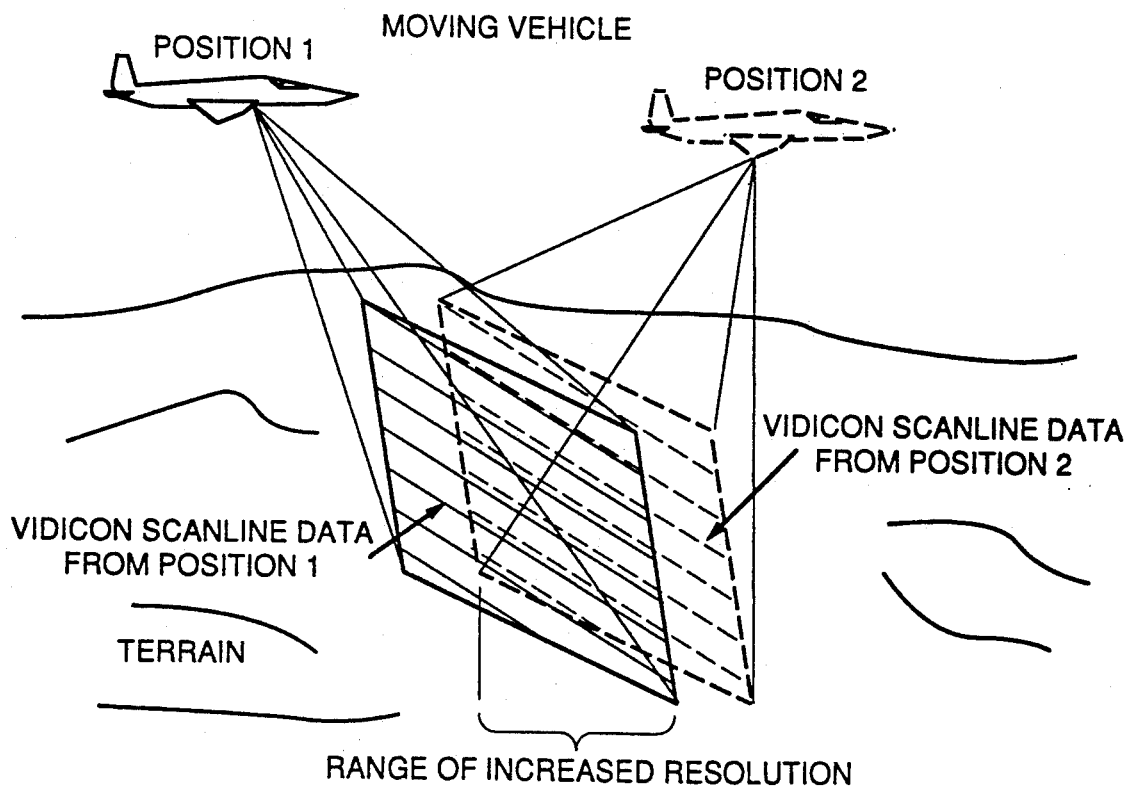
FIG. 13 is a diagram which illustrates the method of the present invention in the special case of doubling the resolution of the camera.

FIG. 13 is a diagram which illustrates the method of the present invention in the special case of doubling the resolution of the camera.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for generating photogrammetric images comprising:
   first means including camera means for generating sequential interlaced scanned images of a scene from a moving vehicle and providing multiple overlapping frames of sequential image data corresponding thereto;
   second means for maintaining said camera at an optimal yaw angle relative to the direction of movement of said vehicle to provide equally spaced scanned lines for each of said frames of image data; and
   third means for processing said multiple overlapping frames of sequential image data to provide image data of enhanced resolution therefrom.

2. The invention of claim 1 wherein said second means is a preprocessor.

3. The invention of claim 1 wherein said third means is a processor.

4. The invention of claim 3 wherein said processor includes an image sharpening processor.

5. The invention of claim 3 wherein said processor includes means for determining the position of the vehicle.

6. The invention of claim 5 wherein said means for determining the position of the vehicle includes a correlator.

7. The invention of claim 6 wherein said processor includes means for providing vehicle speed and position information to said correlator.

8. The invention of claim 7 wherein said processor includes means for providing object identification information to said correlator.

9. The invention of claim 8 wherein said processor includes means for providing a previous frame of image data to said correlator.

10. A system for generating photogrammetric images comprising:
    first means including a Vidicon camera for acquiring sequential images of a scene from a moving vehicle and providing sequential image data corresponding thereto;
    second means for maintaining said camera at an optimal angle relative to the direction of movement of said vehicle; and
    third means for processing said sequential image data to provide image data of enhanced resolution therefrom, said third means including a processor, said processor including:
    means for determining the position of the vehicle, said means for determining the position of the vehicle including:
    a correlator,
    means for providing vehicle speed and position information to said correlator, and
    means for providing object identification information to said correlator, and
    means for providing a previous frame of image data to said correlator and
    an image sharpening processor.

11. A method for generating photogrammetric images including the steps of:
    generating sequential interlaced scanned images of a scene from a moving vehicle with a camera and providing multiple frames of sequential interlaced scanned image data corresponding thereto;

maintaining said camera at an optimal yaw angle relative to the direction of movement of said vehicle to provide equally spaced scanned lines for each of said frames of image data; and processing said sequential image data to provide image data of enhanced resolution therefrom.

12. The invention of claim 11 wherein said optimal angle is defined by $\theta$ and is equal to the arcos (x) and x is defined by the relations:

$$v^2\left[\frac{H^2\left(\frac{m}{2}-1\right)^2}{N^2}+\right.$$

$$\frac{2HV_s\left(\frac{m}{2}-1\right)}{N}\left(m\zeta-\left(\frac{m}{2}-1\right)\tau\right)\sin\alpha +$$

$$V_s^2\left(m\zeta-\left(\frac{m}{2}-1\right)\tau\right)^2\right]x^2 +$$

$$\frac{2HvV_s\left(\frac{m}{2}-1\right)}{N}\cos\alpha\left[\frac{H\left(\frac{m}{2}-1\right)}{N}+\right.$$

$$\left.V_s\left(m\zeta-\left(\frac{m}{2}-1\right)\tau\right)\sin\alpha\right]x +$$

$$V_s^2\cos^2\alpha\left[\frac{H^2\left(\frac{m}{2}-1\right)^2}{N^2}-\right.$$

$$\left.v^2\left(m\zeta-\left(\frac{m}{2}-1\right)\tau\right)^2\right]=0$$

-continued $$v^2\left[\frac{H^2\left(\frac{m}{2}+1\right)^2}{N^2}+\right.$$

$$\frac{2HV_s\left(\frac{m}{2}+1\right)}{N}\left(m\zeta-\left(\frac{m}{2}+1\right)\tau\right)\sin\alpha +$$

$$V_s^2\left(m\zeta-\left(\frac{m}{2}+1\right)\tau\right)^2\right]x^2 +$$

$$\frac{2HvV_s\left(\frac{m}{2}+1\right)}{N}\cos\alpha\left[\frac{H\left(\frac{m}{2}+1\right)}{N}+\right.$$

$$\left.V_s\left(m\zeta-\left(\frac{m}{2}+1\right)\tau\right)\sin\alpha\right]x +$$

$$V_s^2\cos^2\alpha\left[\frac{H^2\left(\frac{m}{2}+1\right)^2}{N^2}-\right.$$

$$\left.v^2\left(m\zeta-\left(\frac{m}{2}+1\right)\tau\right)^2\right]=0$$

where:
- m = degree of resolution improvement (m=2 double the resolution, m=3 triples the resolution, etc.),
- v = velocity of the aircraft,
- H = height of the Vidicon image frame,
- N = number of scan lines per Vidicon frame,
- $V_s$ = velocity of scan lines in the Vidicon frame,
- $\alpha$ = angle between the scan lines and the top of the Vidicon frame,
- $\zeta$ = time lapse between scanning of two consecutive fields, and
- $\tau$ = time required to scan a single scan line.

* * * * *